United States Patent Office 2,701,172
Patented Feb. 1, 1955

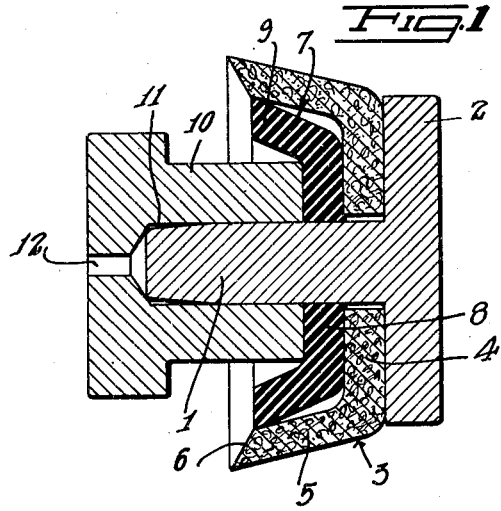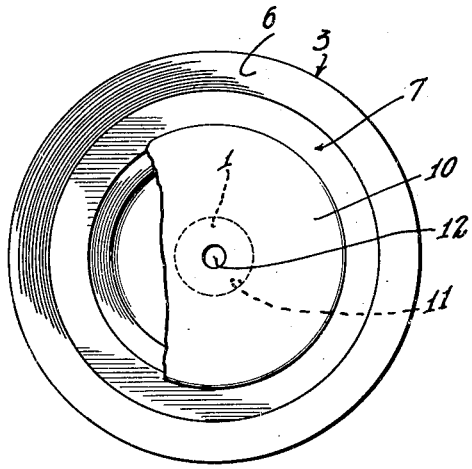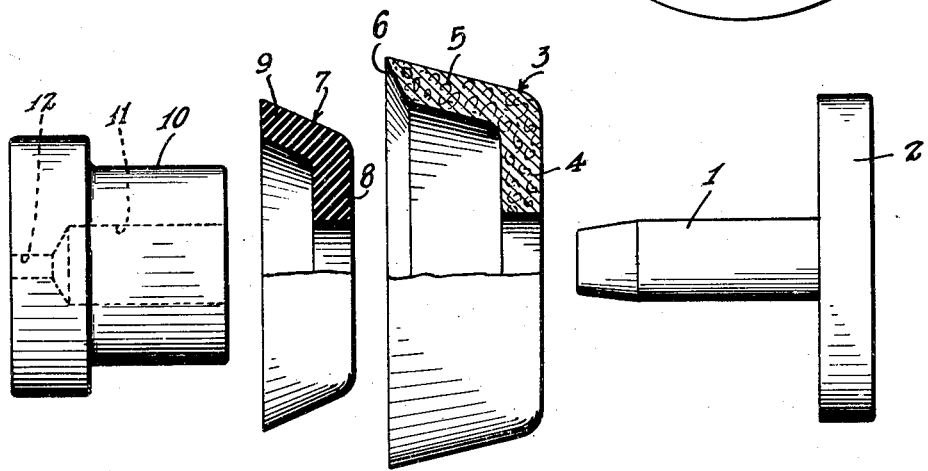

2,701,172

PLUNGER SEAL

Frederick A. Koester, Los Angeles, Calif.

Application May 26, 1950, Serial No. 164,385

2 Claims. (Cl. 309—4)

My invention relates to plunger seals and my present application is a continuation-in-part of my previously filed application, Serial No. 55,047, filed October 18, 1948, entitled Plunger Seal and now abandoned.

Included in the objects of my invention are:

First, to provide a plunger seal which is particularly suitable for manufacturing in small sizes and which has a low friction factor, thereby providing a plunger seal which is particularly suitable for use in air gauges such as tire pressure gauges, air line hand valves, and tire inflation valves.

Second, to provide a plunger seal which employs a "cup leather" backed by a molded expansion member formed of rubber or so-called synthetic rubber, the expansion member being so mounted as to avoid cold flow or displacement even under conditions of long and adverse use.

With the above and other objects in view as may appear hereinafter, reference is made to the accompanying drawings, in which:

Figure 1 is an enlarged sectional view of a plunger seal incorporating my plunger seal.

Figure 2 is an enlarged end view of the assembled plunger seal, with a portion of the retaining cap broken away.

Figure 3 is an exploded view, partially in section, showing the various individual elements of my invention.

My plunger seal includes a plunger stem or mandrel 1 having an integral head 2. The stem 1 receives an outer cup 3 preferably formed of leather and molded to provide a perforated base 4, diverging side walls 5 and a skived or beveled wiping edge 6. The outer cup 3 journals freely on the mandrel 1.

The outer cup 3 receives an inner cup 7 molded of rubber or rubberlike plastic material. It likewise includes a perforated base 8 and diverging side walls 9. The inner cup likewise journals on the mandrel 1, but preferably fits thereon more snugly than the outer cup 3. Furthermore, the diverging side walls diverge at somewhat greater angle than the side walls 5, so that the rim portion only of the side walls 9 bear against the side walls 5 of the outer cup adjacent the skived edge 6.

The mandrel 1 receives a cap 10 having a socket 11 adapted to be pressfitted on the mandrel. To facilitate assembly, the extremity of the mandrel or the opening of the bore 11 may be slightly tapered. The bore or socket 11 does not extend entirely through the cap 10, however, a smaller bleeder hole 12 may be provided for the escape of air during assembly. The depth of the socket or bore 11 is such, that when the parts of the plunger seal are assembled, as shown in Figure 1, the cap is limited in its movement over the mandrel so as to avoid any appreciable axial compression of the outer and inner cups. This is important for the reason that the plastic materials most suited for use as the inner cup have a tendency to "cold flow" under pressure. By avoiding conditions of pressure in the inner cup, there is little or no cold flow even under adverse conditions.

Having fully described my invention, it is to be understood that I do not wish to be limited to the details herein set forth, but my invention is of the full scope of the appended claims.

I claim:

1. A plunger seal involving: a stem having a head; an outer sealing cup and an inner backing cup rotatably mounted on said stem; a collar member adapted to be press fitted on said stem and having a stop whereby said collar may retain said cups on said stem without axial pressure thereon.

2. A plunger seal involving: a stem having a head; an outer sealing cup and an inner backing cup rotatably mounted on said stem; a collar member adapted to be press fitted on said stem and having a stop whereby said collar may retain said cups on said stem without axial pressure thereon; said backing cup being molded to fit freely in said outer cup with radial bearing pressure only at the rims of said cups.

References Cited in the file of this patent

UNITED STATES PATENTS

| | | |
|---|---|---|
| 45,989 | Fuller | Jan. 24, 1865 |
| 56,757 | Jewell | July 31, 1866 |
| 181,226 | Vander Emde | Aug. 15, 1876 |
| 772,457 | Cramer | Oct. 18, 1904 |
| 1,543,505 | Middleton et al. | June 23, 1925 |
| 2,246,685 | Johansen | June 24, 1941 |
| 2,271,746 | Schmalz | Feb. 3, 1942 |
| 2,598,975 | Coulter | June 3, 1952 |